Figure 1:
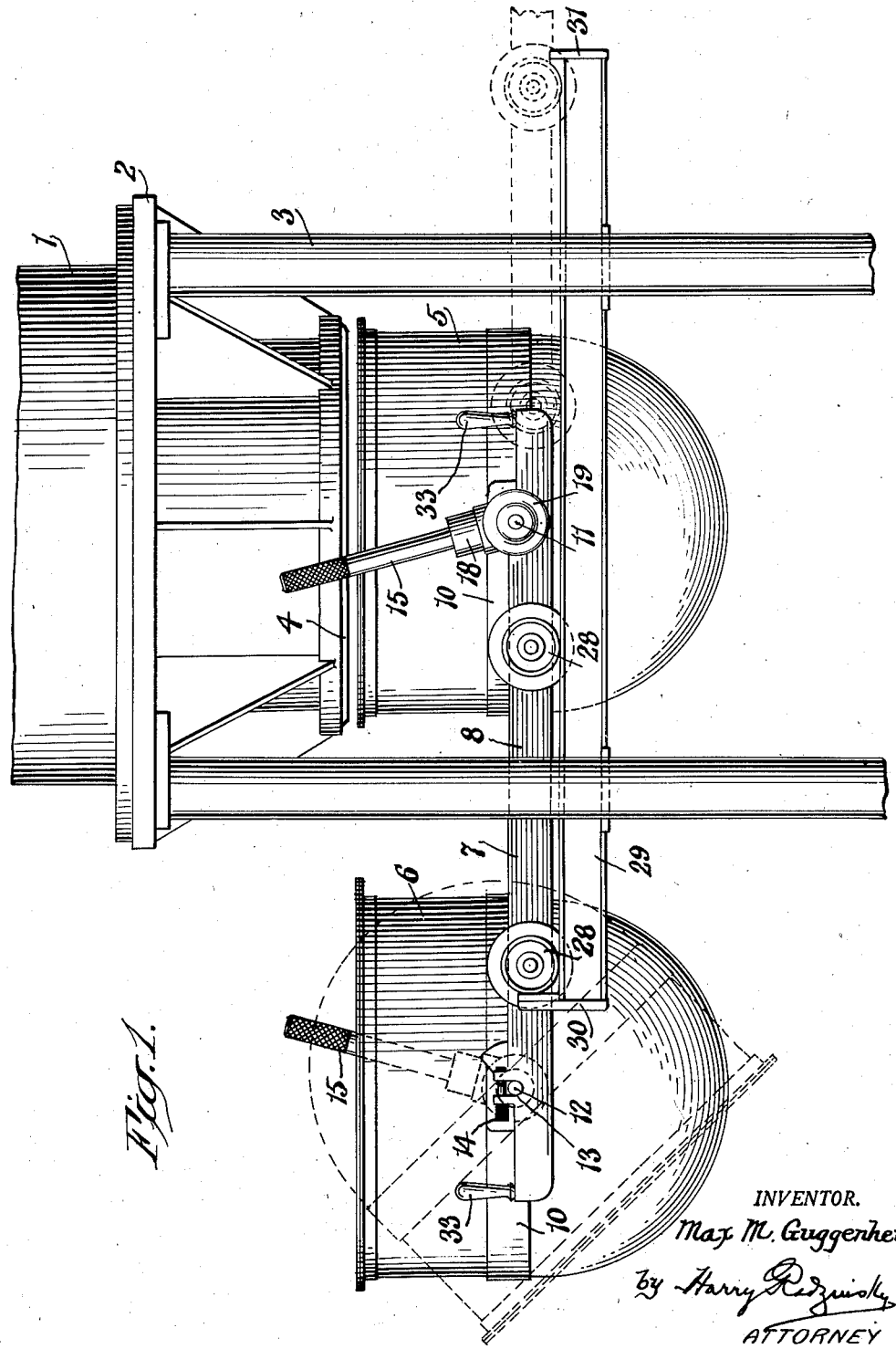

March 1, 1949. M. M. GUGGENHEIM 2,463,171
TILTING DEVICE FOR COOKER KETTLES
Filed Oct. 29, 1947 2 Sheets-Sheet 1

INVENTOR.
Max M. Guggenheim
by Harry Redzinsky
ATTORNEY

March 1, 1949. M. M. GUGGENHEIM 2,463,171
TILTING DEVICE FOR COOKER KETTLES
Filed Oct. 29, 1947 2 Sheets-Sheet 2
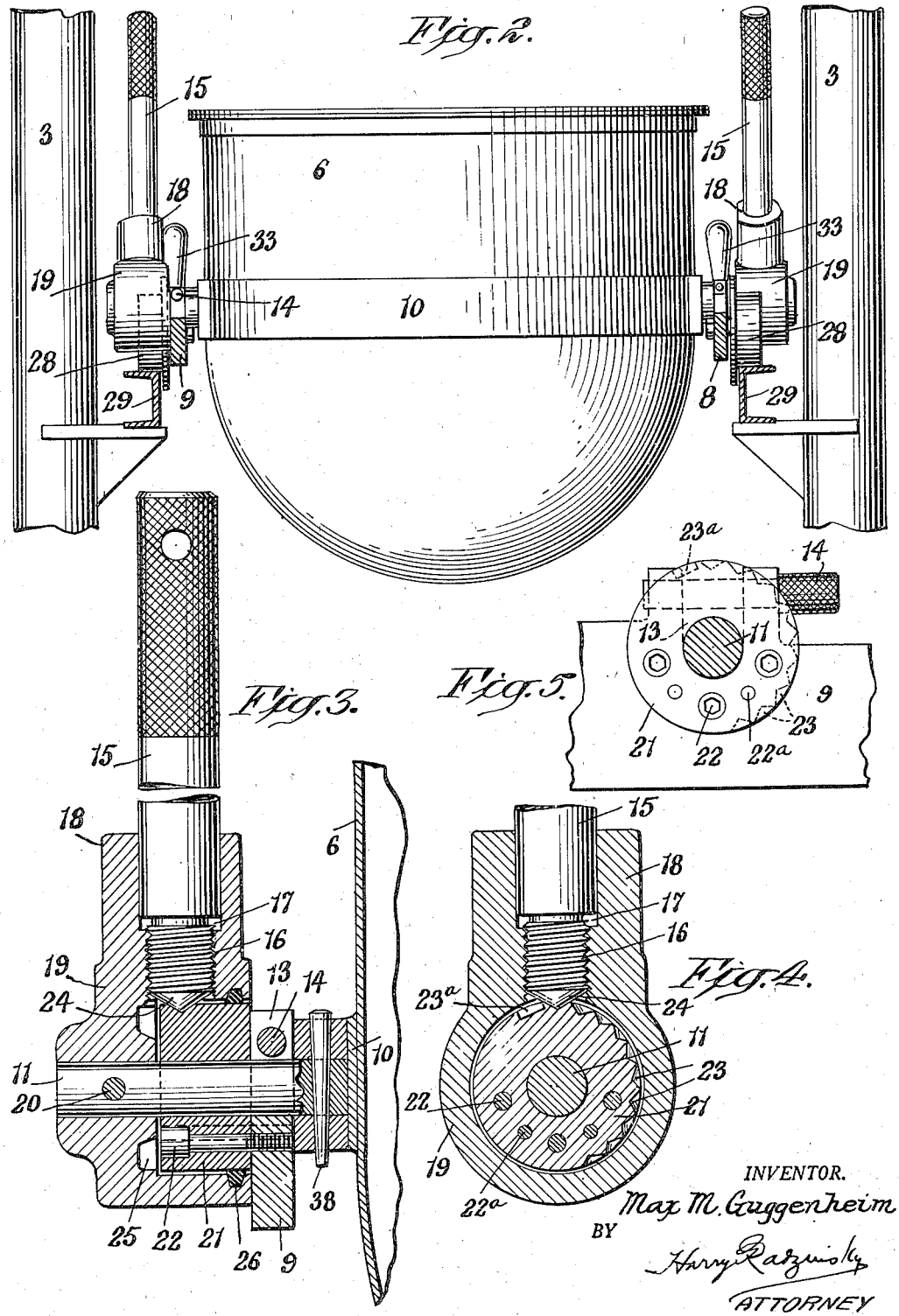
INVENTOR.
Max M. Guggenheim
BY Harry Radzinsky
ATTORNEY Patented Mar. 1, 1949

2,463,171

UNITED STATES PATENT OFFICE 2,463,171

TILTING DEVICE FOR COOKER KETTLES

Max M. Guggenheim, New York, N. Y., assignor to National Equipment Corporation, New York, N. Y., a corporation of New York Application October 29, 1947, Serial No. 782,748

7 Claims. (Cl. 214—1.1)

This invention relates to tilting devices for kettles of the character generally employed in cooking machines and other apparatus. In machines of this kind, and particularly in those employed for heating or cooking confectionery materials, such as syrups, a kettle is generally positioned at the outlet end of the cooker and the cooked or heated contents of the cooker are deposited into the kettle which is then transported to a point where it is tilted so that its contents can be spilled out into suitable receptacles.

The present invention has reference to the means for so mounting a kettle of this character that the kettle may be readily shifted from its position beneath the outlet of the cooker to a suitable position for spilling, and the invention comprehends means by which the kettle can be tilted to various angles under the control of the operator, and may be readily and progressively tilted to facilitate a smooth exit flow of the contents of the kettle.

More particularly, the invention contemplates the provision of means for supporting a plurality of kettles in spaced relation upon a suitable movable carriage so arranged with respect to the outlet of the cooker that while one of the kettles is positioned below said outlet to receive the heated or cooked contents therefrom, another one of the kettles will be located remotely therefrom and in a position where it can be tilted by an operator and its contents thus spilled into suitable receptacles.

The invention has for a further object, the provision of means by which the kettle will be trunnion-supported and provided with a tilting handle and associated parts by means of which the kettle may be selectively and progressively tilted and maintained at various angles either while in position of having its contents spilled out; while the kettle is being filled, or while it is performing other operations.

These and other objects are attained by the invention, a more particular description of which will hereinafter appear and be set forth in the claims appended hereto.

In the accompanying drawings, wherein an illustrative embodiment of the invention is disclosed, Fig. 1 is a side elevation of the lower portion of a cooker, showing a carriage provided with a pair of kettles for successively receiving the cooked material from the cooker and delivering the same to suitable receptacles; Fig. 2 is a transverse sectional view through the supporting rails for the carriage, with parts of the carriage shown in section, and showing one of the kettles; Fig. 3 is a vertical sectional view through the tilting means for the kettle; Fig. 4 is a sectional view, taken at right angles to that of Fig. 3, through the tilting means; and Fig. 5 is a face view of the stop-disk secured to one of the side members of the kettle-carriage.

In the drawing, a portion of the body or heating chamber of the cooker is indicated at 1, the same being suitably supported upon a frame which includes a top member 2, forming the bottom of the steam chamber of the cooker, and supported upon the legs or pedestals 3. The outlet for the cooker is indicated at 4, and the fluid cooked or heated contents of the cooker descends from an outlet pipe located within the outlet 4 and flows downwardly into a kettle located below the outlet 4, as clearly seen in Fig. 1.

In the present embodiment of the invention, two kettles are shown, one being indicated at 5 and the other at 6. That shown at 5 is located in receiving position below the outlet 4 of the cooker, while that shown at 6 is in position to be tilted by the operator so that its contents can be spilled or ejected into a suitable receptacle placed below it. The fully tilted position of the kettle is shown in dotted lines in Fig. 1. It will be apparent from the foregoing, that while one of the kettles is being filled, the other kettle will be positioned laterally of the cooker outlet 4 and so disposed that its contents can be tilted and dumped out.

The two kettles indicated at 5 and 6 are carried by a horizontally-movable carriage 7 which includes a pair of spaced, elongated side bars 8 and 9 connected by suitable cross braces. Each of the kettles 5 and 6 is provided with a circumferentially extending reinforcement or band 10 from which two diametrically-opposite trunnions or pins 11 and 12 project, said pins constituting pivots upon which the kettle swings during its tilting operation. For the support of each kettle, the carriage is provided with the bearings 13, and each of the trunnions 11 and 12 is retained in one of the bearings 13 by means of a pin 14.

For angularly positioning or tilting the kettle, an operating handle 15 is provided, the same being formed at one end with a threaded portion 16, threadably adjustable in an internally threaded part of a passage 17 formed in a boss-like extension 18 of a housing 19. Said housing 19 is secured on a trunnion 11 by means of a pin 20 so that by the swing of the handle 15 the trunnion 11 will also be swung in its bearing and hence the kettle will be tilted accordingly. Trunnion 11 is securely fastened to the kettle by the taper pin 38 (Fig. 3).

At 21 is shown a stop-disk which is fixedly attached to the outer face of a side bar of the carriage 7 by means of the screws 22 and pins 22a. Said disk is provided in a segmental area of its periphery with a plurality of recesses or counterbores 23 (Fig. 4) any one of which is adapted to receive the conical or pointed end or terminal 24 provided at the inner end of the handle 15. It is to be noted that the disk 21 is located within a recess 25 in the housing 19, and that the spacing between the walls of said recess and the disk is sealed by a gasket 26. Thus, liquids or other materials contained in the kettle, and spilling over will be prevented from entering between the parts, while any lubricant contained within the recess 25 will be confined within the housing 19.

As will be seen in Fig. 1, the carriage 7 is provided with rollers 28 which ride upon rails 29 forming part of the supporting frame of the cooker, said rails being provided with the stops 30 and 31 at their opposite ends to limit the horizontal movements of the carriage 7.

In Fig. 1, both of the kettles 5 and 6 are shown in their upright or vertical position. The kettle 5 is shown in position below the outlet 4 to receive a filling of the heated material. At this time, the kettle 6 which has previously been filled, is located laterally of the outlet 4 and is thus positioned well beyond the framing of the cooker and is so located that it can be tilted and its contents spilled out into a suitable receptacle placed below it. When the kettle is in its upright position, it will be noted that the operating handle 15 has its conical end 24 seated in the recess 23a which positions the handle in a slightly angular position as clearly seen in Fig. 1. The handle is at this time locked against movement and hence the kettle is maintained in its upright or "filling" position as long as the end 24 of the handle is engaged with the recess 23a. When it is desired to tilt the kettle, the handle 15 is gripped by its knurled end portion and is turned slightly to thus move its conical end 24 out of the recess 23a. This disengages the handle from the stop disk 21, and hence the handle, the housing 19, the trunnion 11 and the kettle may be swung as a unit and the kettle accordingly will be tilted to the required angle. The tilting can be progressively done by engaging the end 24 of the handle with one recess 23 after another so that the spilling out of the contents of the receptacle can be done slowly and smoothly. The engagement of the conical end or tip 24 of the handle with any one of the recesses 23 is simply and easily done by a slight twist of the wrist and the kettle will remain at any angle according to the recess engaged by the inner end of the handle.

When the spilling out of the contents of the kettle has been completed, the handle 15 is swung back to a position where it can be brought into engagement with the recess 23a so that the kettle will then be maintained in its upright position.

The arrangement of the carriage 7 and the kettles 5 and 6 thereon is such that while one kettle is being filled, the contents of the previously-filled kettle is being spilled out. Movement of the carriage 7 along its supporting rails 29 is facilitated by the provision of the handles 33 extending upwardly from the side members 8 and 9 of the carriage.

While I have described one embodiment of the invention, it is obvious that the same is not to be restricted thereto but is broad enough to cover all structures coming within the scope of the annexed claims.

What I claim is:

1. In an apparatus of the character described, a kettle support, a kettle pivotally carried thereon, means for pivotally supporting the kettle on said support, said means including a pivot pin projecting from the kettle, a stop member on the support surrounding the pivot pin, said stop member having a segmental portion provided with a plurality of recesses, a housing secured on the pivot pin and surrounding the stop member, and an operating handle threadably secured in the housing and adapted for selective engagement with any one of the recesses in the stop member to thereby determine the angular position of the kettle with respect to its support and to hold the kettle in said position.

2. In an apparatus of the character described, a kettle having a projecting pivot pin, a support in which said pin is pivotally mounted, a disk secured to the support and surrounding the pivot pin, the disk being provided with a plurality of recesses in its periphery, a housing secured on the pivot pin and fitting around the disk, said housing having a threaded bore, and an operating handle having a threaded portion adjustable in said threaded bore to thereby cause engagement of the end of said handle with any of the recesses in the disk to thereby determine the angular position of the kettle and retain the kettle in such position.

3. In an apparatus of the character described, a kettle support, a kettle pivotally carried thereon, means for pivotally supporting the kettle on its support, said means including a pivot pin extending radially from the kettle, a disk encircling the pin and within which the pin is rotatable, means for attaching said disk to the support, said disk being provided with a plurality of recesses in its periphery, a housing fitted on the pin and fixedly attached thereto, said housing being provided with a radially extending bore having an internally threaded part, a handle having a threaded end portion located in said bore and in engagement with the threads therein, said handle being thus axially adjustable within the bore to bring its inner end toward or away from the recesses in the periphery of the disk, said inner end of the handle being adapted for selective engagement with any one of said recesses to thereby determine the angular position of the kettle with respect to its support and to hold the kettle in such position.

4. In an apparatus of the character described, a carriage holding a pair of kettles, a support on which the carriage is movable, said support having bearings, each kettle having trunnions pivotal in said bearings, the carriage having a disk secured to it and extending around one of the trunnions, said trunnion being rotative within the disk, the disk having a recessed peripheral edge, a housing secured to the trunnion and extending around the peripheral edge of the disk, said housing having an internally threaded boss, a handle entering said boss and threadably received therein, said handle having an inner end adapted for engagement with any one of the recesses provided in the peripheral edge of the disk.

5. In an apparatus of the character described, a cooker having an outlet, a kettle support mounted below the outlet, said support including a movable carriage on which a plurality of kettles is mounted, means for tilting each of the kettles relative to its support, said tilting means including a trunnion projecting from the kettle and pivotally supported in the support, a disk attached to the support and surrounding the trunnion, said disk having its edge provided with a plurality of recesses, a housing secured to the trunnion and having an internally threaded bore, a handle received in said bore and threaded for engagement with the threads in said bore, said handle being provided with an end directed toward the recesses in the disk and being adapted to be selectively engaged with any one of said recesses to thereby position the kettle at a selected angle and retain the same at such angle relative to its support.

6. In an apparatus of the character described, a carriage, a kettle pivotally mounted thereon, said kettle being provided with pivot pins, one of the pivot pins carrying an internally threaded housing, a handle threadably received in said housing, and a recessed stop member carried by the carriage and surrounding the pivot pin and in position to receive the selective engagement of the end of the handle with any one of its recesses by threading movement of the handle within the housing.

7. In an apparatus of the character described, a carriage holding a pair of kettles, a support on which the carriage is movable, said support having bearings, each kettle having trunnions pivotal in said bearings, the carriage having a disk secured to it and surrounding one of the trunnions, the trunnion being rotative within the disk, the disk having a recessed peripheral edge, a housing secured to the trunnion and fitting over and extending around and enclosing the peripheral edge of the disk, said housing having an internally threaded boss extending radially from it, a handle entering said boss and threadably received therein and adjustable axially of the boss, said handle having a pointed inner end for engagement with any one of the recesses provided in the peripheral edge of the disk, and sealing means for closing any spacing between the edge of the disk and the interior of the housing.

MAX M. GUGGENHEIM.

No references cited.